(12) United States Patent
Janssens et al.

(10) Patent No.: US 12,546,874 B2
(45) Date of Patent: Feb. 10, 2026

(54) METHOD, SYSTEM AND COMPUTER PROGRAM PRODUCT FOR DISTANCE DETERMINATION BETWEEN PERSONS

(71) Applicant: ROMBIT NV, Antwerp (BE)

(72) Inventors: Nico Janssens, Putte (BE); Brett Daman, Muizen (BE)

(73) Assignee: ROMBIT NV, Antwerp (BE)

( * ) Notice: Subject to any disclaimer, the term of this patent is extended or adjusted under 35 U.S.C. 154(b) by 340 days.

(21) Appl. No.: 18/253,266

(22) PCT Filed: Nov. 24, 2021

(86) PCT No.: PCT/IB2021/060920
§ 371 (c)(1),
(2) Date: May 17, 2023

(87) PCT Pub. No.: WO2022/112963
PCT Pub. Date: Jun. 2, 2022

(65) Prior Publication Data
US 2023/0408667 A1 Dec. 21, 2023

(30) Foreign Application Priority Data

Nov. 24, 2020 (BE) .................................. 2020/5847

(51) Int. Cl.
*G01S 11/08* (2006.01)
*G01S 13/02* (2006.01)
*G08B 21/18* (2006.01)
*H04B 17/318* (2015.01)

(52) U.S. Cl.
CPC .......... *G01S 11/08* (2013.01); *G01S 13/0209* (2013.01); *G08B 21/182* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 11,853,410 B2* | 12/2023 | Ohashi | .................... B60R 25/24 |
| 11,956,630 B2* | 4/2024 | Ohashi | ................ H04W 12/068 |
| 11,974,125 B2* | 4/2024 | Ohashi | .................. H04W 12/06 |
| 2007/0229356 A1* | 10/2007 | Kodrin | .................. G01S 5/0289 |
| | | | 342/458 |

(Continued)

FOREIGN PATENT DOCUMENTS

WO 2022112963 A1 2/2022

OTHER PUBLICATIONS

ISR-WO dated Mar. 17, 2022 for PCT/IB2021/060920.

(Continued)

*Primary Examiner* — Adolf Dsouza
(74) *Attorney, Agent, or Firm* — Vorys, Sater, Seymour and Pease LLP

(57) ABSTRACT

A method, system, and computer program product for determining a distance between persons by means of a plurality of battery powered devices each include using ultra-wideband (UWB) tags and UWB anchors, wherein battery powered devices are configured to periodically or quasiperiodically repeat a typical operating pattern, and upon receipt of an announcing signal from a first device by a second device, initiate an atypical operating pattern to determine the distance.

19 Claims, 1 Drawing Sheet

(56) References Cited

U.S. PATENT DOCUMENTS

| | | | | |
|---|---|---|---|---|
| 2011/0316747 | A1* | 12/2011 | Budianu | G01S 11/00 342/387 |
| 2014/0009340 | A1* | 1/2014 | Meador | G01S 13/765 342/458 |
| 2020/0182996 | A1 | 6/2020 | Lee | |
| 2023/0039407 | A1* | 2/2023 | Furuta | H04L 5/0048 |

OTHER PUBLICATIONS

Mazraani Rami et al, "Experimental results of a combined TDOA/TOF technique for UWB based localization systems", 2017 IEEE International Conference on Communications Workshops (ICC Workshops), IEEE,May 21, 2017 (May 21, 2017), p. 1043-1048.

\* cited by examiner

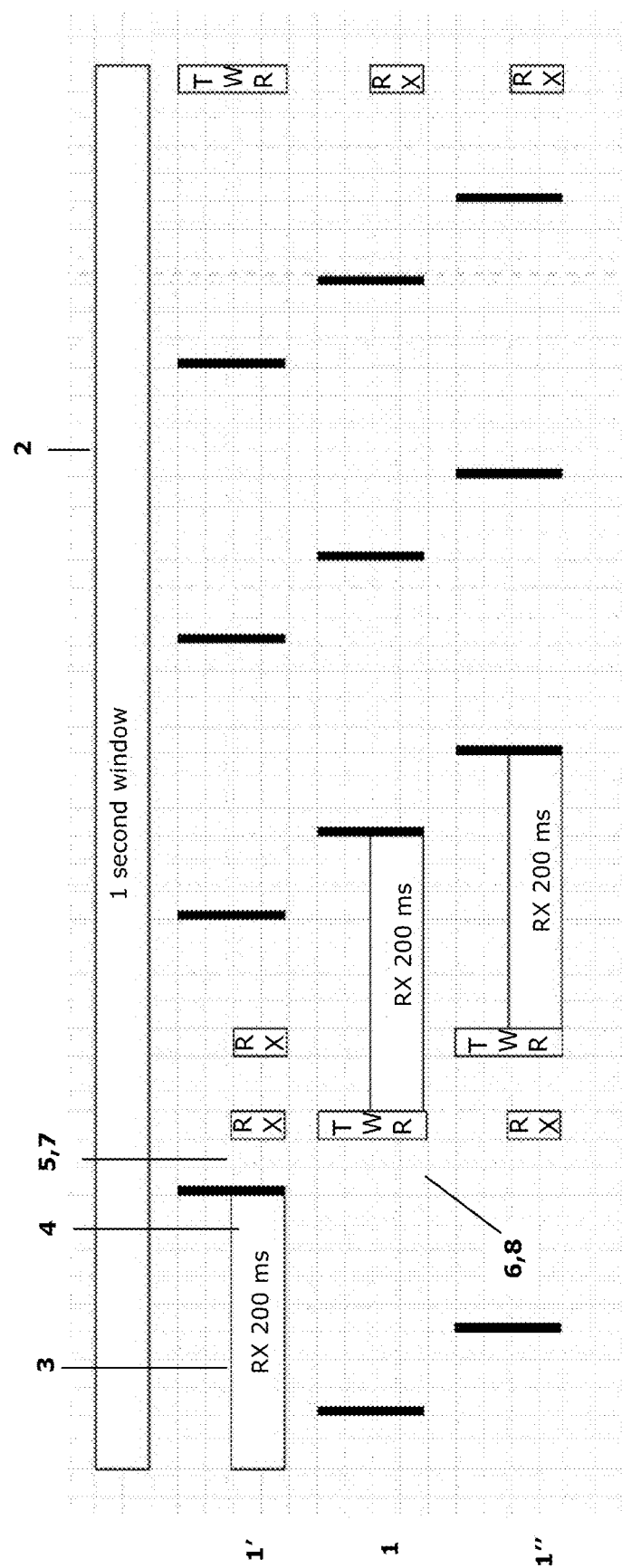

METHOD, SYSTEM AND COMPUTER PROGRAM PRODUCT FOR DISTANCE DETERMINATION BETWEEN PERSONS

TECHNICAL FIELD

The invention relates to a method, system and computer program product for determining a distance between persons by a battery powered device.

PRIOR ART

Determining a distance between battery powered devices each associated with a person is known in the art.

For example, satellite (i.e., GNSS) data captured by means of a smartphone can be used for this. However, this technique is highly inaccurate with error margins that can exceed ten meters.

Alternatively, Bluetooth and/or Wi-Fi data captured by means of a smartphone can be used. However, like satellite data, these techniques are characterized by large inaccuracies with margins of error of more than three meters.

Several indoor UWB techniques allow tracking with margins of error of a few centimeters at most. However, since these indoor tracking techniques require reference anchors, their scalability is very limited. In addition, mobile UWB items have a very limited operating time. This limited operating time is due to the limited battery capacity and high power requirement of the anchor.

There is a need in the art for determining distances between people with great scalability.

In addition, there is a need in the art for a system with a long mobile operating time.

The present invention aims to solve at least some of the problems mentioned above.

SUMMARY OF THE INVENTION

In a first aspect, the invention relates to a method for determining a distance between persons, according to claim 1.

In a second aspect, the invention relates to a system for determining a distance between persons, according to claim 19.

In a third aspect, the invention relates to a computer program product for determining a distance between persons wherein a plurality of devices is provided, each associated with a person and each comprising a battery, ultra-wideband (UWB) tag and UWB anchor, the UWB tag and the UWB anchor being energized by the battery and the UWB anchor being substantially disabled; wherein the computer program product comprises instructions for periodically or quasiperiodically repeating a typical operating pattern on each of the plurality of devices; the typical operating pattern comprising:
  enabling the UWB anchor during an announcing period;
  transmitting an announcing signal of the UWB tag comprising an indication of a transmission time; and
  transmitting a ranging signal at the transmission time;
  wherein the computer program product comprises instructions for initiating an atypical operating pattern on a second device when an announcing signal from a first device is received on the second device during an announcing period of this second device; the atypical operating pattern comprising:
  determining an anchor wake-up period for the second device based on the transmission time of the received announcing signal;
  enabling the UWB anchor of the second device during the determined anchor wake-up period; and
  receiving the ranging signal on the second device during the determined anchor wake-up period; wherein the computer program product comprises instructions for determining a distance between the first device and the second device based on the ranging signal from the first device, which is received on the second device.

Preferred embodiments of the present invention are discussed in claims 2 to 18, as well as throughout the description, examples and figures.

The present invention provides devices that operate according to a typical and atypical operating pattern. The typical operating pattern provides a pattern for announcing an initiating side of a positioning protocol. Based on the announcing signals received or not received on a device during the typical operating pattern, the atypical operating pattern is initiated or not. This atypical operating pattern comprises the steps necessary to complete the positioning protocol.

The invention is advantageous due to a minimal energy consumption of the devices. This minimal energy consumption is due to the typical and atypical operating pattern. On the one hand, energy consumption is minimized by only executing an initiating side of a positioning protocol during the atypical operating pattern. Depending on whether or not announcing signals are received, the positioning protocol is completed or not. Consequently, no energy is spent enabling the UWB anchors to complete the positioning protocol when two individuals are not in close proximity. This saves energy on the devices.

By additionally filtering announcing signals based on signal strength, and then comparing this signal strength with a signal strength threshold to decide whether or not the atypical pattern is being executed, even more energy can be saved on the devices.

By saving energy on the devices, the limited operating time of these devices is significantly increased. This limited operating time is due on the one hand to the limited battery capacity and, on the other hand, to the high energy requirements of the anchor.

Further advantages, embodiments and preferred embodiments of the invention are discussed below in the detailed description, examples and figures.

Furthermore, each feature described above as well as below, may relate to any of the three aspects, even if the feature is described in conjunction with a specific aspect of present invention.

BRIEF DESCRIPTION OF THE DRAWINGS

FIG. 1 shows a schematic overview of a preferred embodiment of the typical and atypical operating pattern according to the present invention.

DETAILED DESCRIPTION OF THE INVENTION

The invention relates to a method, system and computer program product for determining a distance between persons by a battery powered device. The invention has been summarized in the section provided for that purpose. In what follows, the invention is described in detail, and various embodiments are explained.

Unless otherwise defined, all terms used in the description of the invention, including technical and scientific terms, have the meaning as commonly understood by a person skilled in the art to which the invention pertains.

For a better understanding of the description of the invention, the following terms are explained explicitly.

In this document, "a" and "the" refer to both the singular and the plural, unless the context presupposes otherwise. For example, "a segment" means one or more segments.

When the term "around" or "about" is used in this document with a measurable quantity, a parameter, a duration or moment, and the like, then variations are meant of approx. 20% or less, preferably approx. 10% or less, with further preference approx. 5% or less, even with further preference approx. 1% or less, and even with further preference approx. 0.1% or less than and of the quoted value, insofar as such variations are applicable in the described invention. However, it must be understood that the value of a quantity used where the term "approximately", "about" or "around" is used, is itself specifically disclosed.

The terms "comprise", "comprising", "consist of", "consisting of", "provided with", "have", "having", "include", "including", "contain", "containing" are synonyms and are inclusive or open terms that indicate the presence of what follows, and which do not exclude or prevent the presence of other components, features, steps, members, as known from or disclosed in the prior art.

"Ultra-wideband" (UWB), as used herein, refers to a term known in the art that designates signals that occupy a substantial bandwidth with respect to a center frequency. According to the Federal Communications Commission (FCC), a UWB signal is a signal whose fractional bandwidth, that is, the ratio between a bandwidth and the center frequency of the signal, is equal to or greater than 0.2, or whose bandwidth is equal to or greater than 500 MHz. Such bandwidth corresponds in the time domain to very short pulses. This allows UWB-based radar systems to obtain more accurate target information and allows radars to be designed with improved spatial resolution compared to conventional radar systems.

Quoting numerical intervals by endpoints comprises all integers, fractions and/or real numbers between the endpoints, these endpoints included.

In a first aspect, the invention relates to a method for determining a distance between persons. To this end, the method comprises providing a plurality of devices, each of the plurality of devices being associated with a person. Each of the plurality of devices comprising a battery, UWB tag and UWB anchor. The UWB tag and UWB anchor are powered by the battery according to the present method. According to the present method, the UWB anchor is substantially disabled. Each of the plurality of devices is configured to periodically or quasiperiodically repeat a typical operating pattern, the typical operating pattern comprising the steps of:

enabling the UWB anchor during an announcing period;
transmitting an announcing signal of the UWB tag comprising an indication of a transmission time; and
transmitting a ranging signal at the transmission time.

In addition, each of the plurality of devices is also configured so as to initiate an atypical operating pattern on the second device when an announcing signal from a first device of the plurality of devices is received on a second device of the plurality of devices during an announcing period of this second device, wherein the atypical operating pattern comprises the steps of:

determining an anchor wake-up period for the second device based on the transmission time of the received announcing signal;
enabling the UWB anchor of the second device during the determined anchor wake-up period; and
receiving the ranging signal on the second device during the determined anchor wake-up period.

A distance between the first device and the second device is then determined based on the ranging signal from the first device, which is received on the second device.

In a second aspect, the invention relates to a system for determining a distance between persons. To this end, the system comprises providing a plurality of devices, each of the plurality of devices being associated with a person. Each of the plurality of devices comprising a battery, UWB tag and UWB anchor. The UWB tag and the UWB anchor are powered by the battery according to the present system. According to the present system, the UWB anchor is substantially disabled. Each of the plurality of devices is configured to periodically or quasiperiodically repeat a typical operating pattern, the typical operating pattern being configured for:

enabling the UWB anchor during an announcing period;
transmitting an announcing signal of the UWB tag comprising an indication of a transmission time; and
transmitting a ranging signal at the transmission time.

In addition, each of the plurality of devices is also configured so as to initiate an atypical operating pattern on the second device when an announcing signal from a first device of the plurality of devices is received on a second device of the plurality of devices during an announcing period of this second device, wherein the atypical operating pattern is configured for:

determining an anchor wake-up period for the second device based on the transmission time of the received announcing signal;
enabling the UWB anchor of the second device during the determined anchor wake-up period; and
receiving the ranging signal on the second device during the determined anchor wake-up period.

The system is configured to determine a distance between the first device and the second device based on the ranging signal from the first device, which is received on the second device.

In a third aspect, the invention relates to a computer program product for determining a distance between persons wherein a plurality of devices is provided, each associated with a person and each comprising a battery, ultra-wideband (UWB) tag and UWB anchor, the UWB tag and the UWB anchor being energized by the battery and the UWB anchor being substantially disabled. The computer program product comprising instructions for periodically or quasiperiodically repeating a typical operating pattern on each of the plurality of devices, the typical operating pattern comprising instructions for:

enabling the UWB anchor during an announcing period;
transmitting an announcing signal of the UWB tag comprising an indication of a transmission time; and
transmitting a ranging signal at the transmission time.

The computer program product comprising instructions for initiating an atypical operating pattern on a second device when an announcing signal from a first device is received on the second device during an announcing period of this second device, the atypical operating pattern comprising instructions for:

determining an anchor wake-up period for the second device based on the transmission time of the received announcing signal;

enabling the UWB anchor of the second device during the determined anchor wake-up period; and receiving the ranging signal on the second device during the determined anchor wake-up period.

The computer program product comprising instructions for determining a distance between the first device and the second device based on the ranging signal from the first device, which is received on the second device.

A person having ordinary skill in the art will appreciate that the method according to a first aspect of the invention can be implemented in the computer program product according to a third aspect of the invention and can be carried out using the system according to a second aspect of the invention. In what follows, the three aspects of the present invention are therefore treated together. Furthermore, each feature described above as well as below, may relate to any of the three aspects, even if the feature is described in conjunction with a specific aspect of present invention.

The object of the invention is to determine distances between persons. To this end, each of these persons is provided with a device, i.e., a UWB item. These devices each include a UWB tag and UWB anchor, both of which are powered by a battery. The use of these devices is scalable over a large area because no reference anchors need to be provided. In addition, such UWB devices have very small margins of error, allowing exact ranging.

In particular, the invention is suitable for use on a yard, construction site or other industrial setting. Such environments are characterized by large groups of people and limited visibility. In addition, people in such a setting are often busy performing all kinds of tasks. These aforementioned characteristics can ensure that an imposed distance between persons cannot always be observed. By providing these persons with such devices, the distance between the various persons can be monitored in a continuous manner.

The ranging signal transmitted at the transmission time is part of a positioning protocol, preferably this positioning protocol is a time-based positioning protocol. Time-based protocols estimate the distance between a UWB item and a UWB anchor by measuring the time that a radio frequency signal is in transit between both devices (the so-called, time of flight, ToF). For example, the ToF between a UWB tag and anchor can be determined based on a two-way-ranging (TWR) technique or a time-difference-of-arrival (TDoA) technique, or a combination of these.

A TWR technique exchanges multiple packets (POLL, RESPONSE, and FINAL signal) between two or more UWB items. Each packet comprises one or more timestamps. Such timestamps are used to estimate the ToF. In a TWR technique, two UWB items are transmitter and receiver. In a TDoA technique, the UWB tag is a transmitter of a BLINK signal and the UWB anchor is a receiver thereof. An estimate is then made of the ToF based on this BLINK signal. Within the scope of the present invention, a TWR technique is preferably used in that it allows a more precise range-finding. In addition, a TDoA technique is generally used to calculate the position of a tag relative to a Cartesian coordinate system. However, for use according to the present application, i.e., range-finding, such absolute positioning is not required. With a TWR technique, on the other hand, the distance between devices is measured via ToF without projecting them onto a coordinate system. In addition, a TDoA technique requires the clocks of the anchors to be synchronized and to be in a fixed position. After all, these anchors determine the reference points of the coordinate system as discussed above. However, such configuration is not compatible with the requirements set for this application, i.e., the use of mobile UWB devices with limited battery capacity.

A common disadvantage of the devices is a limited operating time of the battery that must power the UWB tag and anchor. To extend the operating time of this battery, the tag and/or anchor can be enabled and disabled during certain time intervals. "Enabled", as used herein, refers to a period of time during which a tag or anchor is in an operative state, i.e., the period during which such tag or anchor obtains energy from the battery. "Disabled", as used herein, refers to a period of time during which a tag or anchor is in an inoperative state, i.e., the period of time during which such tag or anchor is not obtaining power from the battery.

According to a preferred embodiment, the UWB anchor is disabled for at least 50% of a time period of the typical operating pattern, with further preference at least 55%, still with further preference at least 65%, still with further preference at least 65%, still with further preference at least 70% and most preferably at least 75% of period.

Enabling and disabling the tag and anchor periodically or quasiperiodically, without sacrificing much accuracy, presents two major difficulties. A first of these difficulties is timing reception of signals from a first device within an anchor wake-up time of a second device. In addition, since the distance must be estimated as accurately as possible, the signals from the first device must be received on the second device as quickly as possible. Any delay therefore introduces an additional uncertainty in the measurements. A second of these difficulties is the avoidance of collisions of outgoing signals from different devices. In order to allow, despite the above difficulties, the determination of distances between devices, as well as the periodic or quasi-periodic enabling and disabling of the tag and anchor of these devices, the present invention provides a typical and atypical operating pattern for these devices, as well as various additional implementations that also help overcome these difficulties.

The typical operating pattern comprises at least: enabling the UWB anchor during an announcing period; transmitting an announcing signal of the UWB tag comprising an indication of a transmission time; and transmitting a ranging signal at the transmission time.

The atypical operating pattern comprises at least: determining an anchor wake-up period for the second device based on the transmission time of the received announcing signal; enabling the UWB anchor of the second device during the determined anchor wake-up period; and receiving the ranging signal on the second device during the determined anchor wake-up period.

The typical operating pattern is repeated periodically and/or quasiperiodically and provides an operating pattern for announcing an initiating side of a positioning protocol. To this end, each cycle of the typical operating pattern thus provides for the transmission of an announcing signal comprising an indication of a transmission time, as well as the transmitting of the ranging signal at this transmission time. In addition, each cycle of the typical operating pattern also provides for enabling the anchor during an announcing period. Such an operating pattern consumes a minimal amount of energy from the battery powering the anchor as well as the tag.

When an announcing signal from a first device is received on a second device during an announcing period of this second device, the second device initiates the atypical operation pattern. This atypical operating pattern comprises the steps necessary to complete the positioning protocol on a receiving side. In order to complete the positioning protocol, an anchor wake-up period is determined based on the transmission time of the received announcing signal. This anchor wake-up period substantially corresponds to the time at which the ranging signal is transmitted. To take into account delays of the ranging signal due to, for example, the distance traveled of the signal and/or reflections of this signal, a margin is preferably built into the determined anchor wake-up period. Thus, the ranging signal is received during the anchor wake-up period, and a receiving side of the positioning protocol can be completed.

To minimize the margin of error of the positioning protocol, as discussed above, the announcing signal from the first device should be received on a second device as soon as possible during the announcing period of this second device. To this end, preferably as few cycles as possible of the typical operating pattern on both the first and second devices elapse before the atypical operating pattern is initiated on one of these devices. The following preferred embodiments are, among other things, suitable for excluding this drawback.

According to a preferred embodiment, the announcing signal is transmitted two or more times during the typical operating pattern, with further preference at least three times, with further preference at least three times and at most ten times, with even further preference at least three times and at most eight times, with even further preference at least four times and with even further preference at least four times and at most ten times. Transmitting the announcing signal multiple times by the first device increases the probability of reception during the announcing period of the second device.

According to a preferred embodiment, the announcing signal is transmitted three or more times periodically or quasiperiodically during the typical operating pattern, with further preference at least three times and at most ten times, with even further preference at least three times and at most eight times, with even further preference at least four times and with even further preference at least four times and at most ten times. Transmitting the announcing signal multiple times by the first device increases the probability of reception of this signal during the announcing period of the second device.

According to a preferred embodiment, the announcing signal is transmitted periodically or quasiperiodically during the typical operating pattern and the periodicity or quasiperiodicity of the announcing signal is less than or equal to the announcing period, preferably the periodicity or quasiperiodicity is less than the announcing period. Quasiperiodicity refers to an irregular pattern. By stating that such a periodicity pattern is smaller than a periodicity, this statement should be interpreted as at most equal to this periodicity. By making the periodicity or quasiperiodicity smaller or at most equal to the announcing period, the announcing signal from the first device is received on the second device every typical cycle during the announcing period of this second device.

According to a preferred embodiment, the announcing signal is transmitted periodically during the typical operating pattern and the periodicity of the announcing signal is less than or equal to the announcing period, preferably the periodicity or quasiperiodicity is less than the announcing period. By making the periodicity or quasiperiodicity smaller or at most equal to the announcing period, the announcing signal from the first device is received on the second device every typical cycle during the announcing period of this second device.

According to a preferred embodiment, the announcing signal and/or the ranging signal from each of the plurality of devices is time-shifted with respect to each other. This can be done, for example, by means of a CCA (Clear Channel Assessment support) technique.

Preferably, the typical operating pattern is a fixed pattern. "Fixed pattern", as used herein, refers to a pattern that is performed periodically or quasiperiodically over a fixed time interval, wherein the pattern comprises a number of actions, and wherein the various actions of the pattern are executed at a fixed time point relative to the fixed time interval of the fixed pattern. A device with a fixed typical operating pattern is easy to implement. In addition, interactions with other devices can be easily predicted for such devices.

According to a preferred embodiment, the typical operating pattern of each of the plurality of devices are time-shifted relative to each other. By time-shifting the typical operating patterns of each of the plurality of devices relative to each other, collisions of transmitted signals are avoided. In addition, it allows one to avoid the overlapping of anchors by announcing periods. These advantages are particularly relevant to a fixed typical pattern.

The time-shifting of operating patterns relative to each other can be organized in all sorts of ways. For example, this can be achieved by initiating the typical operating pattern at start-up of the devices. Assuming that different devices will always be started at different times (e.g., in a millisecond range), the typical operating patterns of different devices will always be shifted relative to each other. The shift can also be determined arbitrarily otherwise, for example by means of a randomization.

Alternatively, the shift of the devices is predetermined and/or determined by a predefined shifting parameter. For example, the shift of each device can be determined in advance. This can be done, for example, by embedding a random number during the production of each device. Preferably, however, the shifts of the devices are fixed by a pre-established shifting parameter relative to a reference time point. This reference time point can represent any arbitrary point. To this end, an internal clock of the various devices must be synchronized. Preferably, the shift for each of the devices is less than the announcing period.

According to a preferred embodiment, a ranging signal is transmitted substantially contiguous with the announcing period. According to a further preferred embodiment, a ranging signal is transmitted substantially contiguously before the announcing period. In the case of time-shifted typical patterns, by sending out a ranging signal contiguous with the announcing period, there is a high probability that this signal will be picked up during the announcing period of another device. In addition, in the case of a TWR positioning protocol, an anchor wake-up period can be defined contiguously with the announcing period. This prevents wear of the anchor due to frequent enabling and disabling.

According to a preferred embodiment, an announcing signal is transmitted substantially immediately after the announcing period. According to a further preferred embodiment, an announcing signal is transmitted substantially contiguously after the announcing period. In the case of time-shifted typical patterns, by sending out an announcing signal contiguous with the announcing period, there is a high probability that this signal will be picked up during the announcing period of another device.

According to an embodiment, the typical operating pattern is a variable pattern. "Variable pattern", as used herein, refers to a pattern that is performed periodically or quasiperiodically over a fixed or variable time interval, wherein the pattern comprises a number of actions, and wherein the various actions of the pattern are executed at a variable time point relative to the time interval of the pattern.

According to a preferred embodiment, a signal strength indicator (RSSI) is determined for the announcing signal from the first device, which is received on the second device and wherein the atypical operation pattern is initiated when the RSSI is greater than a predetermined signal strength threshold. For example, the threshold may be set to a strength associated with devices located at a distance substantially greater than a predetermined distance threshold. This implementation has the technical advantage that devices that are located at too great a distance are filtered out. Thus, upon receipt of such announcing signal, an atypical operation pattern will not be initiated. Because of this, no energy is consumed by the anchor, and the device operating time is maximized.

According to a preferred embodiment, when the determined distance between the first and second devices is less than a predetermined distance limit value, an alarm is sounded. Thus, it is communicated to the two people associated with these devices that they are exceeding a predetermined distance limit value. The alarm can be sounded through one or more notification media. Such notification media include auditory notification media such as a loudspeaker, visual notification media such as LED lighting or motion notification media such as a vibrating element. With further preference, the alarm is sounded by means of auditory notification media. With even further preference, the alarm is sounded by means of a loudspeaker, preferably provided on each device. The speakers may also be associated with the room in which the person is located. However, if the distance limit value is exceeded, the contact between the persons can be registered in, for example, a log system.

According to a preferred embodiment, the devices are wearable devices, preferably one or more of a badge, wristband or wearable safety item such as glasses, helmet, jacket, safety shoe, and the like, most preferably a wristband.

In what follows, the invention is described by way of non-limiting examples illustrating the invention, and which are not intended to and should not be interpreted as limiting the scope of the invention.

Example

The present example relates to a method for determining a distance between persons by means of battery powered UWB devices. The current example is also illustrated by means of FIG. 1.

The devices (1) according to the present example are each provided with a battery, UWB tag and anchor. The UWB tag and anchor are powered by the battery when in the operative state. However, to conserve energy, the UWB anchor is substantially disabled, i.e., is in an inoperative state.

To enable range-finding between two devices (1', 1"), a positioning protocol must be completed between them. According to the present example, this is a TWR protocol. To this end, the devices (1', 1") are operated according to a typical and atypical operating pattern. The typical operating pattern comprises a fixed pattern of operations to be performed by the device (1) over a fixed period of time (2). In addition, the typical operating pattern is periodically repeated.

The operations of the typical operating pattern comprise the initiating side of a positioning protocol. In the case of a TWR technique, this is a POLL signal (6), which is transmitted by the tag at a transmission time. In order to make clear to surrounding devices that this TWR protocol is initiated at the transmission time, an announcing signal (4), including an indication of the transmission time, is also transmitted by the tag of the device (1). The typical operating pattern also comprises a 200 ms announcing period (3) during which the anchor is enabled. When an announcing signal (4) from a first device (1') is received on a second device (1") during an announcing period (3) of this second device (1"), this second device (1") initiates an atypical operation pattern, which comprises the steps necessary to complete the TWR positioning protocol.

During the atypical operating pattern, the anchor of the second device (1") is enabled for an anchor wake-up period (5). This anchor wake-up period (5) is determined for the second device (1") based on the indication of the transmission time of the received announcing signal (4). Based on this determined anchor wake-up period (5), the UWB anchor of the second device (1") is enabled so that the POLL signal (6), which was announced, is received on this second device (1"). Based on this POLL signal (6), a RESPONSE signal (7) is then sent from the second device (1") to the first device (1'). When this RESPONSE signal (7) is received, a FINAL signal (8) is output from the first unit (1') to the second unit (1"). Based on these exchanged signals (6, 7, 8), the distance between the devices (1', 1") is then determined.

According to the present example, the determined distance is compared with a predetermined distance limit value. If the determined distance is less than this limit value, an alarm will sound on each of the two devices (1', 1"). In addition, this contact between the two devices (1', 1") is saved.

The contact can be stored, for example, in a central server to which the devices are connected. This can be the same server as the one needed for synchronization between the different devices (1).

Alternatively, such contact is stored in the devices themselves, to be read out at the end of, for example, a working day, and stored in a server.

The invention claimed is:
1. A method for determining a distance between persons, comprising:
    providing a plurality of devices, each associated with a person and each comprising a battery, ultra-wideband (UWB) tag and UWB anchor, the UWB tag and the UWB anchor being energized by the battery and the UWB anchor being substantially disabled;
    wherein each of the plurality of devices is configured to periodically or quasiperiodically repeat a typical operating pattern;
    the typical operating pattern comprising the steps of: enabling the UWB anchor during an announcing period; transmitting an announcing signal of the UWB tag comprising an indication of a transmission time; and transmitting a ranging signal at the transmission time;
    wherein, when an announcing signal from a first device is received on a second device during an announcing period of this second device, the second device initiates an atypical operation pattern;

the atypical operating pattern, comprising the steps of: determining an anchor wake-up period for the second device based on the transmission time of the received announcing signal; enabling the UWB anchor of the second device during the determined anchor wake-up period; and receiving the ranging signal on the second device during the determined anchor wake-up period; wherein a distance between the first device and the second device is determined based on the ranging signal from the first device, which is received on the second device.

2. The method according to claim 1 preceding claim 1, wherein the UWB anchor is disabled at least 50% of a time period of the typical operating pattern, preferably at least 75% of this time period.

3. The method according to claim 1, wherein the announcing signal is transmitted two or more times during the typical operating pattern, preferably at least four times.

4. The method according to claim 1, wherein the announcing signal is transmitted periodically or quasiperiodically three or more times during the typical operating pattern.

5. The method according to claim 1, wherein the announcing signal is transmitted periodically or quasiperiodically during the typical operating pattern and wherein the periodicity or quasiperiodicity of the announcing signal is less than or equal to the advertising period.

6. The method according to claim 1, wherein the announcing signal is transmitted periodically during the typical operating pattern and wherein the periodicity of the announcing signal is less than or equal to the advertising period.

7. The method according to claim 1, wherein the announcing signal and/or the ranging signal of each of the plurality of devices are time-shifted with respect to each other.

8. The method according to claim 1, wherein the typical operating pattern is a fixed pattern.

9. The method according to claim 1, wherein the typical operating pattern of each of the plurality of devices is time-shifted relative to each other.

10. The method according to claim 1, wherein an announcing signal is transmitted substantially contiguous with the announcing period.

11. The method according to claim 1, wherein an announcing signal is transmitted substantially contiguously after the announcing period.

12. The method according to claim 1, wherein a ranging signal is transmitted substantially contiguous with the announcing period.

13. The method according to claim 1, wherein a ranging signal is transmitted substantially contiguously before the announcing period.

14. The method according to claim 1, wherein the typical operating pattern is a variable pattern.

15. The method according to claim 1, wherein a signal strength indicator (RSSI) is determined for the announcing signal from the first device, which is received on the second device and wherein the atypical operation pattern is initiated when the RSSI is greater than a predetermined signal strength threshold.

16. The method according to claim 1, wherein when the determined distance between the first and second devices is less than a predetermined distance limit value, an alarm is sounded.

17. The method according to claim 1, wherein the devices are wearable devices, preferably one or more of a badge, wristband or wearable safety item, most preferably a wristband.

18. The method according to claim 1, wherein the ranging signal comprises a poll signal and wherein the distance between the first and second devices is determined using a Two-Way-Ranging (TWR) technique.

19. A system for determining a distance between persons, comprising:
a plurality of devices, each associated with a person and each comprising a battery, ultra-wideband (UWB) tag and UWB anchor, the battery configured to power the UWB tag and the UWB anchor and wherein the UWB anchor is substantially disabled;
wherein each of the plurality of devices is configured to periodically or quasiperiodically repeat a typical operating pattern;
the typical operating pattern configured for: enabling the UWB anchor during an announcing period; transmitting an announcing signal of the UWB tag comprising an indication of a transmission time; and transmitting a ranging signal at the transmission time;
wherein a second device is configured to initiate an atypical operating pattern when an announcing signal from a first device is received on the second device during an announcing period of this second device;
the atypical operating pattern configured for: determining an anchor wake-up period for the second device based on the transmission time of the received announcing signal; enabling the UWB anchor of the second device during the determined anchor wake-up period; and receiving the ranging signal on the second device during the determined anchor wake-up period;
wherein the system is configured to determine a distance between the first device and the second device based on the ranging signal from the first device received on the second device.

* * * * *